United States Patent

Cheng et al.

Patent Number: 5,966,209
Date of Patent: Oct. 12, 1999

[54] LENS MODULE TESTING APPARATUS

[75] Inventors: Ming Tsung Cheng; Jih-Yung Lu, both of Taipei Hsien, Taiwan

[73] Assignee: Acer Pheripherals, Inc., Taiwan

[21] Appl. No.: 09/092,919

[22] Filed: Jun. 8, 1998

[30] Foreign Application Priority Data

Dec. 16, 1997 [TW] Taiwan ................................. 86220888

[51] Int. Cl.$^6$ ................................................. G01M 11/00
[52] U.S. Cl. ........................................................ 356/124.5
[58] Field of Search ............................... 356/124, 124.5, 356/125, 126, 127

[56] References Cited

U.S. PATENT DOCUMENTS

| | | | |
|---|---|---|---|
| 3,733,135 | 5/1973 | Diakides et al. | 356/124.5 |
| 3,912,396 | 10/1975 | Hartmann | 356/124.5 |
| 5,303,023 | 4/1994 | Portney et al. | 356/124.5 |

FOREIGN PATENT DOCUMENTS 85109212  7/1985  Taiwan.

*Primary Examiner*—Hoa Q. Pham
*Attorney, Agent, or Firm*—Pillsbury Madison & Sutro LLP

[57] ABSTRACT

A lens module testing apparatus includes a light source, a grating reflects the light emitting from the light source to form a object light locating at a object location, an adjustable holding device holds a lens module between the object location and a image location, adjusting the holding device to position the lens module to form a testing image of the object light at the image location. A CCD is located at the image location to receive the intensity of the testing image and then generate an electrical signal. A PC analyzes the electrical signal.

5 Claims, 3 Drawing Sheets

LENS MODULE TESTING APPARATUS

BACKGROUND OF THE INVENTION

1. Field of the Invention

The present invention relates in general to an apparatus for testing a lens module, more specifically, to more precise determination of the quality parameter of a lens module used in a system of reflective type object.

2. Description of the Related Art

A scanner is widely used as an image input device for a personal computer. Referring to FIG. 1, a common form of a scanner comprises a glass plate 12 on which an object 11 (generally is a document) is disposed, a light source 13 emits the light to pass through the glass plate 12 to generate an object light reflected from the object 11. The object light is further reflected by a mirror 14 (generally comprises several mirrors in sequence, herein represented by one mirror briefly). Then an image is formed on a charge coupled device(CCD) 16 by passing the reflected object light through a lens module 15, and the CCD 16 produces an electrical signal corresponded to the object 11. The light source 13, the mirror 14, the lens module 15 and the CCD 16 are disposed in the same module, so they always move simultaneously with same speed toward the same direction to keep object length and image length fixed while scanning.

In the process of mass production of lens modules, different aberrations are introduced into different lens modules, and the quality parameters of lens modules may be affected. Referring to FIG. 2, that is a conventional testing system for measuring quality parameters of lens modules to determine whether each lens module is acceptable or not for installation into a scanner. The lens module 15 is mounted on a holding device 24. An emulated object light is formed by the light emitting from a light source 21 passing through a grating 22, and then the testing image of the grating 22 is projected onto CCD 25 by the lens module 15. Thus, the testing process is as follows:

(1) putting the grating 22 and the CCD 25 at the positions around the object location and image location of the lens module 15 respectively;

(2) rotating the lens module 15 around its optical axis to get the MAX modified MTF and fixing the lens module 15 on that angle;

(3) moving the CCD 25 along the optical axis back and forth to measure the magnification of the lens module 15;

(4) comparing all the quality parameters with acceptable specification to determine whether the lens module 15 is acceptable or not.

In Taiwanese patent application serial No. 85109212, the detail of the operation of the conventional testing system is described. MTF and magnification is calculated following the below equations:

MTF=(the max. value of gray level–the min. value of gray level)/ 256*100%

Magnification=length of image/length of object=(CCD dot number corresponding to image*length of CCD dot)/length of object However, the lens module testing system described above contains the disadvantages described below:

First, during the real scanning operation, the distance between object and CCD is fixed. However, in the testing system, the CCD can be moved for fitting to the different focal length of different lens modules. That will cause some test errors.

Second, during the real scanning operation, the object light is reflected by a document; however, the emulated object light used in testing system is formed by the light passing through the grating. Since these two lights are generated in different ways, that certainly causes test errors.

SUMMARY OF THE INVENTION

Therefore, an object of the present invention is to provide a lens module testing system which has reflective type object light and fixed distance between object and CCD during the testing process.

The present invention achieves the more than-indicated objects by providing a light source, a grating which reflects the light emitted from the light source to form a object light locating at a object location, an adjustable holding device which holds a lens module between the object location and a image location, adjusting the holding device to position the lens module to form a testing image of the object light at the image location. A CCD disposed at the image location for converting the intensity of the testing image to an electrical signal for analysis.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
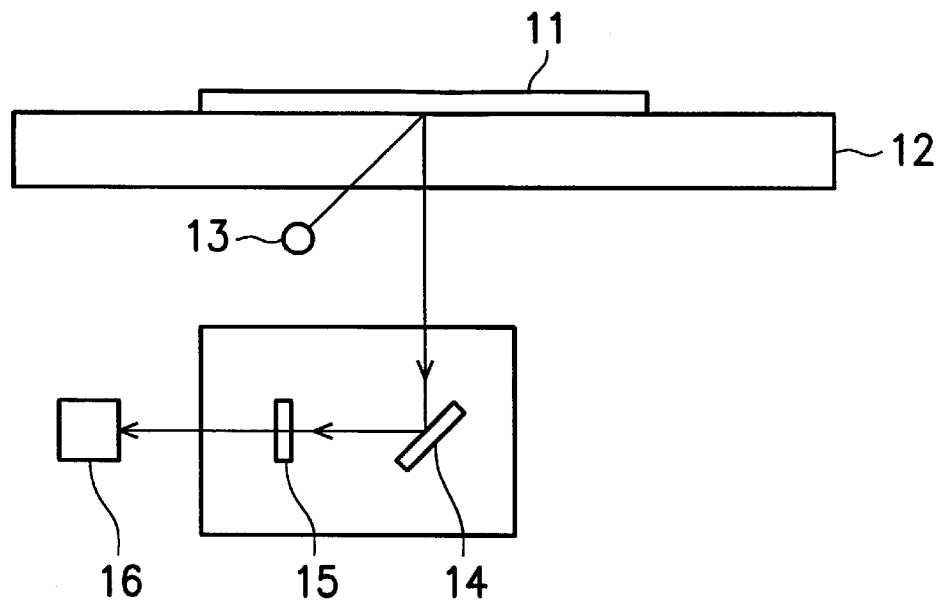
FIG. 1 is a schematic diagram of a scanner.
Figure 2:
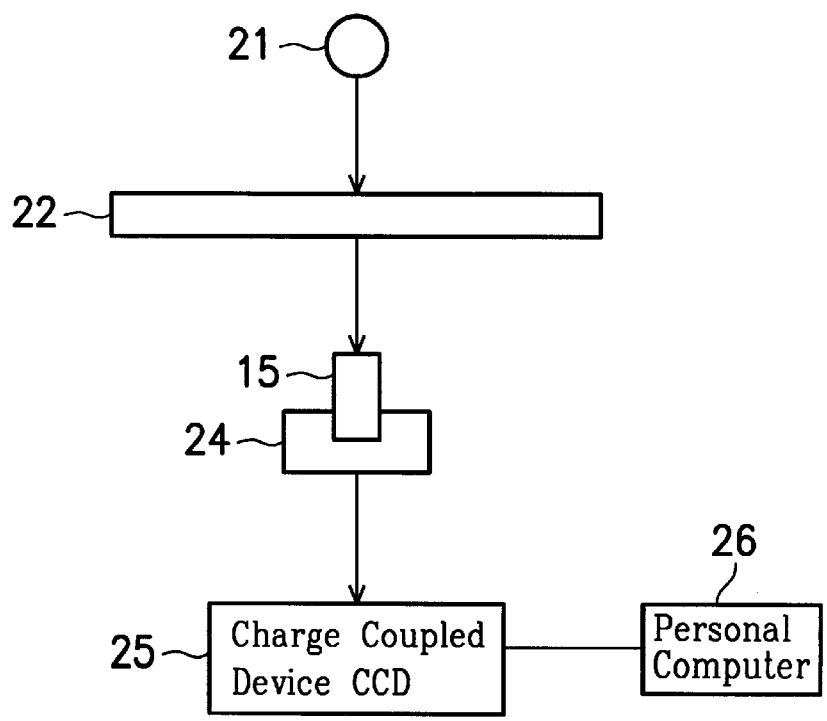
FIG. 2 is a schematic diagram showing a conventional lens module testing system.
Figure 3:
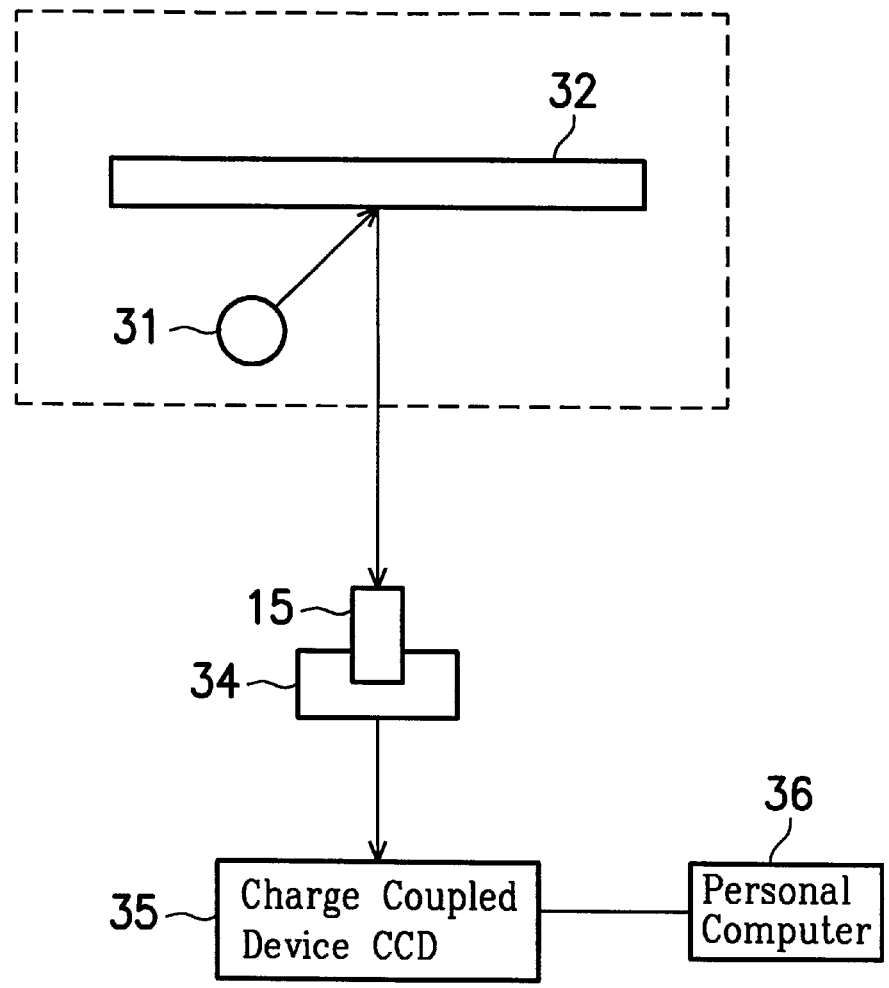
FIG. 3 is a schematic diagram showing a reflective type lens module testing apparatus of this invention.
Figure 4:
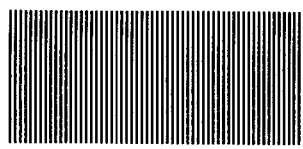
FIG. 4 shows a pattern of a grating according to an example of this invention.

FIG. 3 shows an embodiment of a reflective type testing system of this invention for measuring quality parameters, e.q. MTF, of a lens module. The testing system includes a light source 31, a grating 32, an adjustable holding device 35, a charge coupled device (CCD) 34 and a personal computer(PC) 36. The grating 32 is used as a reflective object for forming a reflective light pattern at an object location when the grating 32 is illuminated by the light source 31.

In order to get a best testing light pattern at the image location, the adjustable holding device 34 is used to hold a lens module 15. The holding device 34 driven by a stepping motors can make the lens module 15 move along or rotate around the optical axis of itself.

Figure 5:
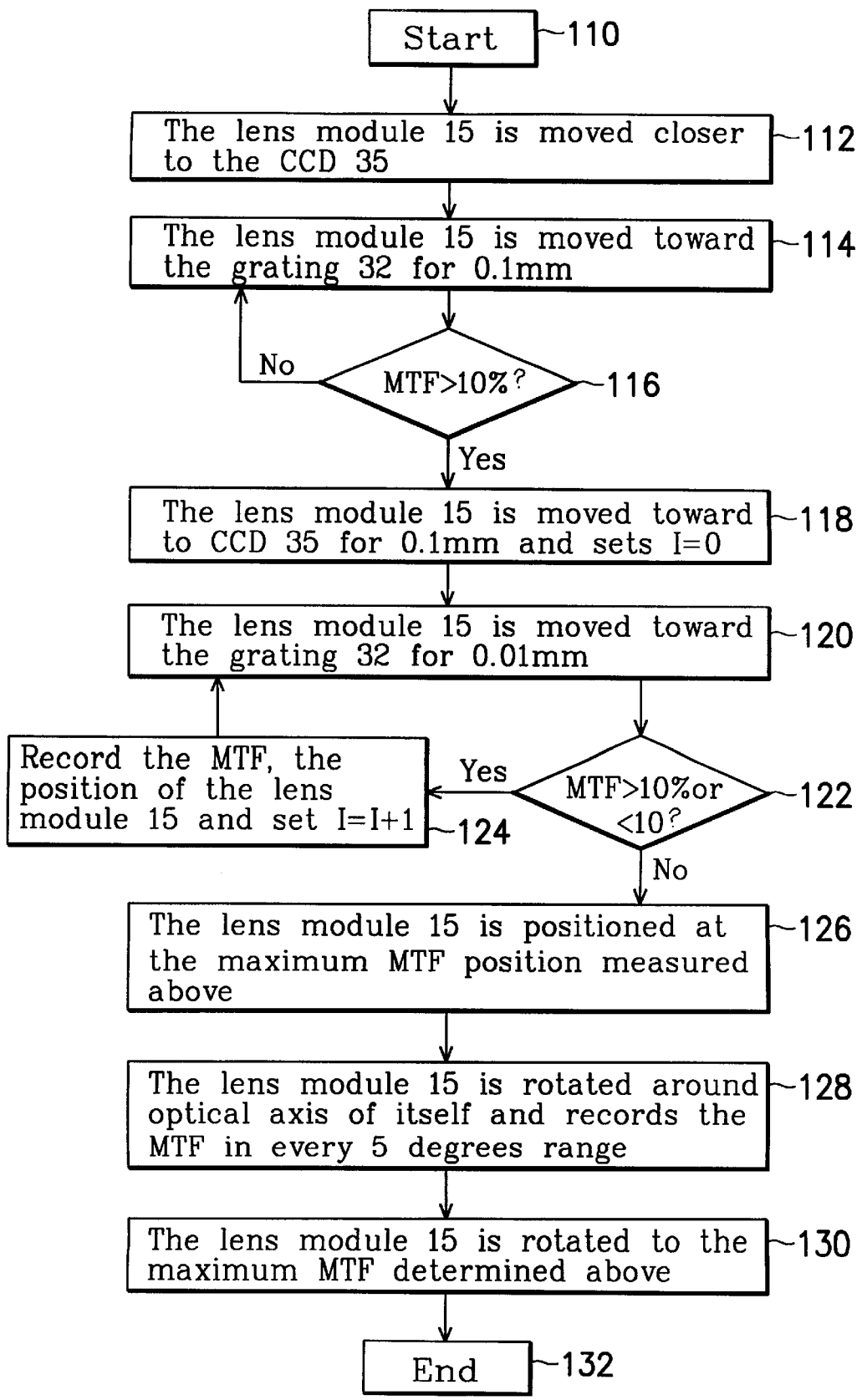
FIG. 5 is a flow chart showing the operation of the reflective type lens module testing apparatus of this invention.

The operation of the testing system to test quality parameters of the lens module 15 is described as below with additional reference to a flowchart of FIG. 5.

step 110: the lens module 15 is put on the holding device 34.

step 112: the lens module 15 is moved closer to the CCD 35.

step 114: the lens module 15 is moved along its optical axis toward to the grating 32 for 0.1 mm.

step 116: the process checks if the MTF of the lens module 15 is greater than 10%. When the MTF is greater than 10%, the grating 32 is near the object location of the lens module 15, then the process jumps to step 118 to do fine tuning process. Otherwise the process goes back to step 114 to do course tuning process.

step 118: the lens module 15 is moved toward to CCD 35 for 0.1 mm and sets I=0;

step 120: the lens module 15 is moved toward the grating 32 for 0.01 mm.

step 122: the process checks if the MTF of the lens module 15 is greater than 10% or I is less than 10. If yes, the process goes to step 124 to record the MTF, the position of the lens module 15 and set I=I+1, then goes back to step 120. If no, the process jumps to step 126.

step 126: the lens module 15 is positioned at the location corresponding to the maximum MTF recorded in step 124.

step 128: the lens module 15 is rotated around optical axis of itself and records the MTF in every 5 degrees range.

step 130: the lens module 15 is rotated to the angle corresponding to the maximum MTF recorded in step 128, then goes to step 132 to finish the testing process.

For different specification of lens module testing, the holding device 34 can be designed to be replaceable and the grating 32 can be designed to be moveable.

Corresponding to a scanner, the reflective type test apparatus of this invention can provide more precise testing process by using a reflective object light and keeping the distance between the grating and CCD fixed(i.e. distance between the object and image).

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for testing a lens module comprising:

means for forming a reflective light pattern;

means for holding the lens module, which can make the lens module move along and rotate around the optical path of said lens module, to make a testing image substantially formed at the image location of said lens module by passing said reflective light pattern through said lens module;

means for converting said testing image formed at said image location of said lens module to an electrical signal;

means for analyzing said electrical signal to determine the quality parameters of said lens module.

2. The system as claimed in claim 1 wherein said means for forming a reflective light pattern comprises:

a light source;

a reflective object illuminated by said light source for forming said reflective light pattern.

3. The system as claimed in claim 2 wherein said reflective object is a grating.

4. The system as claimed in claim 1 wherein said converting means is a charge coupled device.

5. The system as claimed in claim 1 wherein said analyzing means is a personal computer.

* * * * *